United States Patent
Buehler

(10) Patent No.: US 6,746,498 B1
(45) Date of Patent: Jun. 8, 2004

(54) ABRASIVE WITH A MODIFIED SURFACE AND A METHOD FOR MAKING IT

(75) Inventor: Mark F. Buehler, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/319,256

(22) Filed: Dec. 12, 2002

(51) Int. Cl.7 .................................................. B24B 1/00
(52) U.S. Cl. ........................ 51/308; 438/691; 438/692; 438/693; 106/3
(58) Field of Search .............................. 51/308; 106/3; 438/690, 691, 692, 693

(56) References Cited

U.S. PATENT DOCUMENTS 4,871,376 A * 10/1989 DeWald ...................... 51/298
5,628,806 A * 5/1997 Celikkaya et al. ............ 51/309
6,299,659 B1 * 10/2001 Kido et al. .................... 51/309
6,547,843 B2 * 4/2003 Shimazu et al. .............. 51/309

* cited by examiner

Primary Examiner—Michael Marcheschi
(74) Attorney, Agent, or Firm—Mark V. Sooloy

(57) ABSTRACT

A composition is described that comprises an abrasive, and a hydrocarbon containing component that is coupled to the abrasive. Such a composition may be included in a slurry that is used to polish a substrate, when forming a semiconductor device. Also described is a method for modifying a surface of an abrasive that comprises coupling a hydrocarbon containing component to the surface of the abrasive.

2 Claims, 1 Drawing Sheet

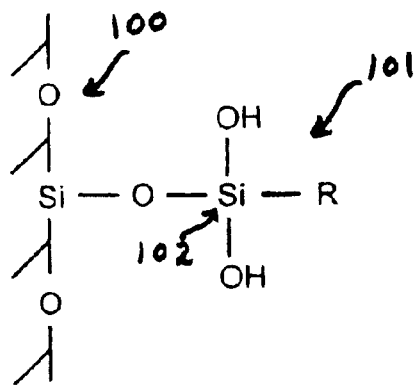
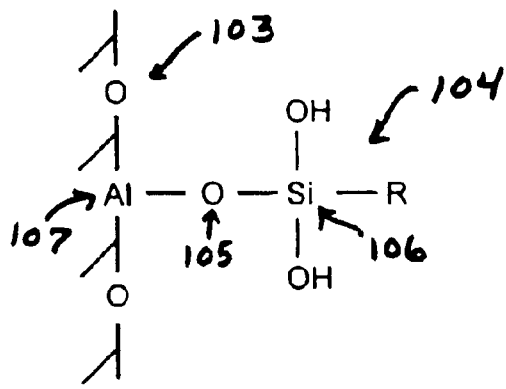
Figure 1a          Figure 1b
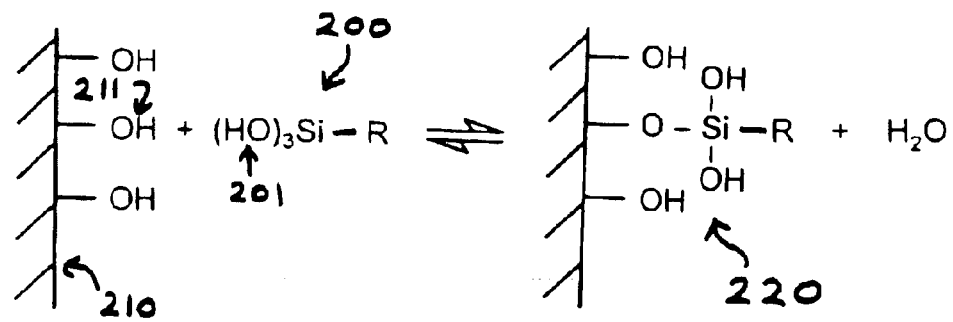
Figure 2

ABRASIVE WITH A MODIFIED SURFACE AND A METHOD FOR MAKING IT

FIELD OF THE INVENTION

The present invention relates to abrasives for use in chemical mechanical polishing, in particular, the polishing of metal or dielectric layers that may be formed when making semiconductor devices.

BACKGROUND OF THE INVENTION

Semiconductor devices may include a shallow trench isolation region and several metal layers that are separated by dielectric layers. As that region and those layers are formed, it may be necessary to remove from the device excess metal or dielectric material. A chemical mechanical polishing process is commonly used to perform that function. In such a process, a slurry may be dispensed onto a polishing pad to facilitate removal of the excess material.

Although a slurry's composition may differ depending upon the type of material that is removed during the polishing operation, it generally will include an abrasive. For the chemical mechanical polishing of metal or dielectric material, two forms of silica abrasive are commonly used— i.e., fumed silica and colloidal silica. Fumed silica may, for example, be used when polishing the dielectric material that forms the device's shallow trench isolation region. Colloidal silica may be used when polishing barrier layers, e.g., those comprising tantalum. In general, fumed silica enables a high polish rate, but exhibits poor defect performance, while using colloidal silica may limit defects, but may also reduce the polishing rate.

In many applications, however, both a high polish rate and good defect performance are desired. Accordingly, there is a need for an abrasive that facilitates a high polish rate while providing satisfactory defect performance. The composition of the present invention provides such an abrasive.

BRIEF DESCRIPTION OF THE DRAWINGS

FIGS. 1a–1b represent embodiments of the composition of the present invention.

FIG. 2 illustrates a mechanism believed to cause a hydrocarbon containing component to attach to the surface of an abrasive.

DETAILED DESCRIPTION OF THE PRESENT INVENTION

A composition is described that comprises an abrasive, and a hydrocarbon containing component that is coupled to the abrasive. The composition may be included in a slurry that is used to polish a substrate. Also described is a method for modifying a surface of an abrasive that comprises coupling a hydrocarbon containing component to the surface of the abrasive.

In the following description, a number of details are set forth to provide a thorough understanding of the present invention. It will be apparent to those skilled in the art, however, that the invention may be practiced in many ways other than those expressly described here. The invention is thus not limited by the specific details disclosed below.

In one embodiment of the composition of the present invention, the abrasive is an oxide abrasive, e.g., a silica abrasive or an alumina abrasive, and the hydrocarbon containing component comprises a hydrocarbon ligand that is coupled to the oxide abrasive. The hydrocarbon containing component may have the molecular formula $(OX)_y MOA_b R$, in which X is hydrogen or an alkyl group, y is between 0 and 2, M is a metal element, A comprises a constituent bonded to the metal element, b is between 0 and 2, and R is the hydrocarbon ligand. In a preferred embodiment, M is silicon. The hydrocarbon ligand may comprise alkyl chains of varying length to which one or more functional groups may be attached. Functional groups, which may be coupled to such an alkyl chain, may have oxidizing or reducing properties. Examples of such functional groups include carboxylic acid, aldehydic, phosphoric, sulfuric, nitrate or amino groups.

FIGS. 1a and 1b represent examples of compositions that include such a hydrocarbon containing component. The FIG. 1a composition represents an abrasive derived from a fumed silica or a colloidal silica. Surface 100 of the silica component is coupled to hydrocarbon containing component 101 via a chemical bond. In this embodiment, silicon atom 102 is bonded to the hydrocarbon ligand R and to a pair of hydroxyl groups. FIG. 1b represents a similar composition in which the abrasive is derived from an alumina abrasive instead of a silica abrasive. In this embodiment, surface 103 of the alumina component is coupled to hydrocarbon containing component 104 via the bonds between oxygen atom 105 and silicon atom 106 and between oxygen atom 105 and aluminum atom 107.

To make the composition of the present invention, the surface of an abrasive is modified by coupling to it a hydrocarbon containing component. The hydrocarbon containing component may comprise a hydrocarbon ligand and a coupling agent for coupling the hydrocarbon ligand to the surface of the abrasive. When the coupling agent comprises a hydroxyl or alkoxy group, the hydrocarbon containing component may have the molecular formula $(OX)_y MA_b R$, in which X is hydrogen or an alkyl group, y is between 1 and 3, M is a metal element (e.g., silicon), A comprises a constituent bonded to the metal element, b is between 0 and 2, and R is a hydrocarbon ligand. Preferably, the hydrocarbon ligand comprises an alkyl chain with no more than about 20 carbon atoms.

Such a hydrocarbon containing component may be coupled to the abrasive's surface by exposing the abrasive to a solution that contains that component. The hydrocarbon containing component and the abrasive should be allowed to react for a sufficient time to enable that component to bond to the abrasive's surface. The reaction rate, and the extent to which the hydrocarbon containing component covers the abrasive's surface, may depend upon the concentration of that component, and the solution's temperature.

FIG. 2 illustrates a mechanism believed responsible for causing a hydrocarbon containing component, with at least one hydroxyl group, to attach to an abrasive's surface. In the illustrated embodiment, hydrocarbon containing component 200 is a silicon based compound (which may be referred to as a silane coupling agent) that includes hydrocarbon ligand R and hydroxyl groups 201. Surface 210 of the abrasive includes hydroxyl group 211. (Hydroxyl groups 201 and 211 may be part of silanol groups.) It is believed that hydrogen bonds initially join hydrocarbon containing component (a.k.a. silane coupling agent) 200 to surface 210 of the abrasive. A subsequent hydrolysis reaction between a hydroxyl group of component 200 and hydroxyl group 211 of surface 210 may then take place. Such a reaction may release water while component 200 is chemically bonded to surface 210 of the abrasive—generating structure 220.

The composition of the present invention may be added to slurries that are used to polish substrates. When making semiconductor devices, a substrate may be polished with such a slurry that comprises a hydrocarbon containing component that is coupled to the surface of an abrasive. In one embodiment, the substrate may comprise a metal. In another embodiment, the substrate may comprise a dielectric layer.

The composition of the present invention may be added to slurries that are used in different applications. Different polishing operations may require different polish rates and may tolerate defects to varying degree. Modifying the abrasive surface with different hydrocarbon containing components (e.g., hydrocarbon ligands with different lengths and functional groups) may give the abrasive different properties—enabling one to create abrasives that are suitable for slurries that are used in a variety of applications.

In one example, a slurry that enables a relatively "soft" polish may be desired, when polishing a relatively soft ultra low-k dielectric layer, which traditional abrasives may damage. Permanently modifying the surface of a colloidal silica abrasive, by coupling to it a hydrocarbon ligand (e.g., a hydrocarbon chain) of controlled length and functionality, may yield an abrasive that enables a satisfactory soft polish. Such a ligand may provide a soft stop for the abrasive, which may decrease the polish rate and reduce the surface damage that may generate defects. In another example, an abrasive's surface may be modified with a hydrocarbon ligand that includes an oxidizing or reducing functional group. A slurry that contains an abrasive, which is modified with a hydrocarbon ligand that includes an oxidizing functional group, may be particularly effective for the chemical mechanical polishing of metal, e.g., copper.

These examples, which demonstrate how certain abrasive's surfaces may be modified with hydrocarbon containing components that are tailored for different polishing applications, are not intended to be limiting. In this regard, the present invention contemplates any composition that includes any abrasive to which a hydrocarbon containing component is coupled.

The composition of the present invention enables the development of slurries for use in chemical mechanical polishing processes that remove metal or dielectric material at different rates and that exhibit varying defect performance. Such a composition may be generated in a relatively simple and inexpensive way using a method that may be easily controlled. Note that the method described above may enable slurry recycling, because the modified abrasive can be regenerated, if the hydrocarbon containing component is damaged or detached from the abrasive (e.g., during the polishing process).

Although a few examples of components that may be used to create the composition of the present invention are given here, those skilled in the art will appreciate that others may be used instead. In this regard, the composition is not limited to modified silica abrasives, but instead includes any abrasive that may be contained in slurries used in chemical mechanical polishing, e.g., alumina abrasives or any other oxide based abrasive. Moreover, the composition is not limited to including the above described silane based components, but may include a variety of other hydrocarbon containing components that may be used to modify the surface of an abrasive.

In addition to using the composition of the present invention to enhance certain processes for making semiconductor devices, it may be used in many other contexts. Although the foregoing description has specified certain components that may be included in the above described composition and has specified certain steps and materials that may be used to make it, those skilled in the art will appreciate that many modifications and substitutions may be made. Accordingly, it is intended that all such modifications, alterations, substitutions and additions be considered to fall within the spirit and scope of the invention as defined by the appended claims.

What is claimed is:

1. A method of forming a semiconductor device comprising:

polishing an ultra low-k dielectric layer with a slurry that comprises a hydrocarbon ligand that is coupled to the surface of a colloidal silica abrasive, the ligand providing a soft stop for the abrasive, which decreases the polish rate.

2. The method of claim 1 wherein a hydrocarbon containing component that has the molecular formula $(OH)_3SiR$, wherein R is the hydrocarbon ligand, is coupled to the surface of the colloidal silica abrasive before the ultra low-k dielectric layer is polished with the slurry.

* * * * *